UNITED STATES PATENT OFFICE.

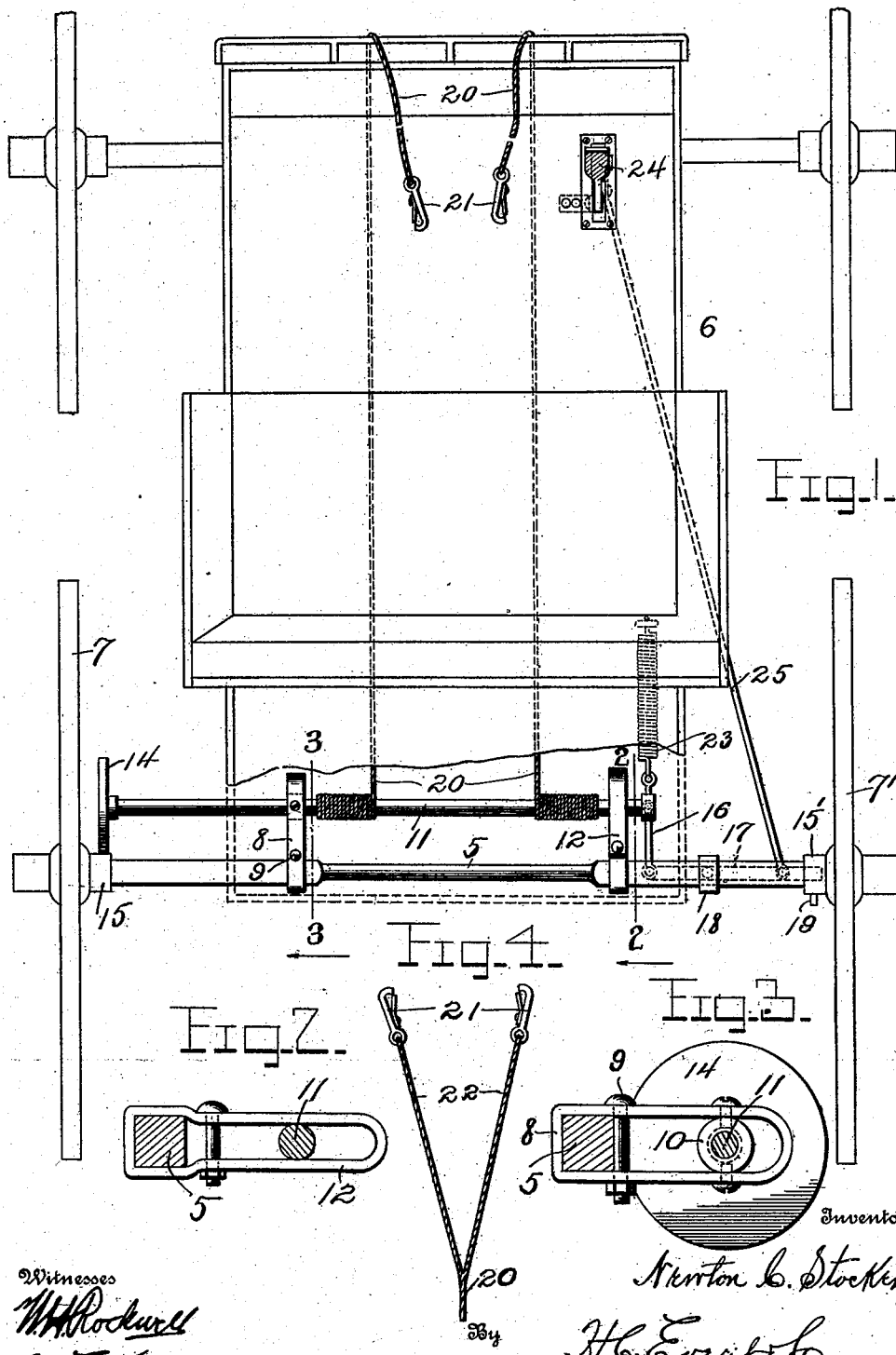

NEWTON C. STOCKER, OF CEDAR RAPIDS, IOWA.

HORSE-HITCHING DEVICE.

No. 900,964.   Specification of Letters Patent.   Patented Oct. 13, 1908.

Application filed January 23, 1908. Serial No. 412,230.

*To all whom it may concern:*

Be it known that I, NEWTON C. STOCKER, a citizen of the United States of America, residing at Cedar Rapids, in the county of Linn and State of Iowa, have invented certain new and useful Improvements in Horse-Hitching Devices, of which the following is a specification, reference being had therein to the accompanying drawing.

This invention relates to certain new and useful improvements in horse hitching devices, and the primary object of the invention is to provide a quick, sure, and safe means of hitching a horse or team when left standing hitched to the vehicle.

The invention has for its further object to provide a hitching device carried by the vehicle to which the horse or team is hitched, and so connected at certain parts thereof when the hitch is connected with the bridle of the horse or team, and the latter moves forward, the device will be brought into operation so as to draw backwardly on the bit of the bridle and thus restrain the animal or animals from forward movement.

The invention resides in the novel construction, combination and arrangement of parts as will be hereinafter more fully described and then particularly pointed out in the claim and in describing the invention in detail, reference will be had to the accompanying drawing forming a part of this application, and wherein like numerals of reference will be employed to indicate like parts through the several views on the drawings, in which:

Figure 1 is a plan view of a vehicle partly broken away in order to better show the manner in which the device is attached to said vehicle. Fig. 2 is a transverse sectional view through the axle of the vehicle on line 2—2 of Fig. 1. Fig. 3 is a similar view on line 3—3 of Fig. 1. Fig. 4 is a detail plan view of a modified form of hitching line.

The device embodies in connection with a hitching line or lines, means for winding said line or lines upon a shaft upon the forward movement of the vehicle, so that the movement of the animal or animals will be arrested. The hitching device is carried by the vehicle, and by its use the employment of hitching straps to be attached to hitching posts, or hitching straps with weights thereon is obviated.

A practical embodiment of the invention is shown in the accompanying drawings in which 5 indicates the rear axle of the vehicle 6. Attached to this axle adjacent to one of the rear wheels 7 is a bracket bearing 8 which may be made so as to span the axle, and be held in position by means of a bolt 9, as clearly shown in Fig. 3 of the drawings. It will of course be understood that any approved means may be employed for securing this bracket bearing 8 to the rear axle 5. The said bracket bearing 8 extends forwardly of the rear axle 5 and has mounted therein near its forward end a swivel 10 which receives the hitch-line winding shaft 11. This hitch-line winding shaft also extends through a guide bracket 12 secured to the rear axle 5 in a manner as shown in Fig. 2 of the drawings or in any other desired manner. The shaft 11 is passed through the swivel 10 in order that said shaft may have a movement which will permit the ends thereof to move towards and away from the rear axle 5, for a purpose as will more presently appear.

On the end of the shaft 11 that projects through the bracket bearing 8 is a friction wheel 14 which is adapted to engage with the hub 15 of one of the rear wheels 7. The other end of the shaft 11 extends beyond the guide bracket 12 and has connected thereto a link 16, the rear end of which projects to a point underneath the rear axle 5 where it is pivotally connected to a lever 17 pivotally hung in a hanger or bracket 18 attached to the rear axle 5. The outer end of said lever 17 overlaps the hub 15′ of the rear axle wheel 7′ of the vehicle, and this hub is provided with a stud or stop pin 19 which, when the lever 17 is lying underneath the axle parallel therewith will engage with the outer end of said lever, to which stud the stop pin, when the lever 17 is pulled forward, clears said lever as will be more fully described hereinafter. Attached to the shaft 11 are the rear ends of the hitching lines 20 which may be carried to the forward part of the vehicle in any desired manner, the present illustration showing them carried underneath the body of the vehicle, each line being preferably provided at its outer end with a snap hook 21.

In Fig. 4, I have illustrated how the hitching lines may be brought together and provided at the ends with branches 22, each branch being provided with a snap hook 21, which construction may be advantageously employed where a single horse is attached to the vehicle. This same construction may, it is evident, be employed for the outer end of each hitching line, so that where a team is hitched to a vehicle, means is provided for connecting the hitching-line with each ring of the bit, instead of on only one side of the bit.

To the end of the shaft 11 is attached an expansion spring 23 which normally exerts a forward pull on this end of the shaft 11, thus tending to throw the friction wheel 14 into engagement with the hub 15 of the wheel 7. This will be permitted it is evident by reason of said shaft being mounted in the swivel 10.

As shown in Fig. 1 of the drawings, the device is in position where, assuming that the hitching lines are attached to the bridles of the horses, any forward movement of the horse or horses causes a winding of the shaft 11 due to the friction wheel 14 engaging with hub 15, thus causing a winding of the hitching lines 20 on the shaft 11, and arresting the forward movement of the horse or horses.

When it is desired to have the mechanism in inoperative position, the driver by means of either a foot or hand lever 24 actuates lever 17 through connecting rod 25 which is attached to said foot or hand lever 24 and to the lever 17. This pulls the outer end of said lever 17 forwardly, thus causing the link 16 to swing the shaft 11 so as to move the friction wheel 14 out of engagement with hub 15 of the wheel 7, and thus place the device in inoperative position, the stud or pin 19 in this position clearing the lever 17 so as not to interfere with the revolving of wheel 7'. This is due to the fact that the outer end of the lever 17 is pulled forward far enough so that the pins 19 will not strike same so long as the lever 17 is held in the aforesaid position.

The stud or pin 19 is employed for the purpose of releasing the tension on the hitch lines 20 as soon as the team makes a backward movement.

It will be evident as above pointed out that the said pin or stud passes the lever 17 without engaging it when the vehicle is in the forward movement, but when it starts backward, the stud or pin engages with the lever, temporarily releasing the pressure on the friction wheel 14, and thus allowing the hitching lines to unwind of their own tension, and release the horse or team from the firm grip in which they are held. To bring the lever 17 into position where the pin 19 will engage the same, it is evident the controlling lever 24 must be released so as to allow the lever 17 to be moved by the spring 23 into alinement with the axle 5.

The hitching device being connected to the bridles of the horse or team normally, it will be observed that in event of an attempt to run away, all that is necessary, is to release the controlling lever 24 and bring the mechanism into play.

It will be understood that the controlling lever 24 whether it be a foot controlled or a hand controlled lever, will be of a type which is capable of being locked to hold the mechanism out of operative position. Consequently, when the driver stops, and leaves the horse or team all that is necessary to do, it being understood that the hitching lines are connected with the bridles, is to disengage the controlling lever 24 so as to allow the expansion spring 23 to place the parts in operative position.

Having fully described my invention what I claim and desire to secure by Letters Patent is:

In a device of the type described, the combination with a vehicle, of a bracket-bearing and a guide-bracket carried by the rear axle of said vehicle, a winding-shaft swiveled in the bearing-bracket and extending through the guide-bracket to move freely therein, a friction wheel carried by one end of said winding-shaft to engage the hub of one of the vehicle wheels, hitching-lines attached at one end to said winding-shaft and adapted to wind thereon as the shaft is rotated, a link carried by the other end of said winding shaft, a hanger secured to the rear axle of said vehicle, a lever pivotally hung in said hanger and pivotally connected at its inner end to said link, a locking lever carried by the vehicle body and a rod connecting said locking lever with the lever carried by the axle, said locking lever and rod normally holding the friction wheel out of engagement with said wheel hub, and a spring connected to the other end of said link and to the vehicle body for automatically moving the friction wheel into engagement with the wheel hub when the locking lever is released.

In testimony whereof I affix my signature in the presence of two witnesses.

NEWTON C. STOCKER.

Witnesses:
F. O. MEKOTA,
FRANK WELCH.